(12) United States Patent
Makino (10) Patent No.: US 10,852,708 B2
(45) Date of Patent: Dec. 1, 2020

(54) NUMERICAL CONTROL DEVICE (71) Applicant: FANUC CORPORATION, Yamanashi (JP)

(72) Inventor: Iwao Makino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 18 days.

(21) Appl. No.: 15/829,374

(22) Filed: Dec. 1, 2017

(65) Prior Publication Data

US 2018/0173189 A1    Jun. 21, 2018

(30) Foreign Application Priority Data

Dec. 16, 2016 (JP) ................................ 2016-244745

(51) Int. Cl.
*G05B 19/19* (2006.01)
*G05B 19/4067* (2006.01)

(52) U.S. Cl.
CPC ......... *G05B 19/19* (2013.01); *G05B 19/4067* (2013.01); *G05B 2219/34427* (2013.01);
(Continued)

(58) Field of Classification Search
CPC .......... G05B 19/19; G05B 2219/34427; G05B 2219/37077
See application file for complete search history.

(56) References Cited

U.S. PATENT DOCUMENTS 4,980,627 A * 12/1990 Joboji ................ G05B 19/4067
318/563
5,793,635 A    8/1998 Niwa
(Continued)

FOREIGN PATENT DOCUMENTS

CN    101393448 A    3/2009
CN    102029446 A    4/2011
(Continued)

OTHER PUBLICATIONS

Japanese Office Action dated May 15, 2018, for Japanese Patent Application No. 2016-244745.
(Continued)

*Primary Examiner* — Mohammad Ali
*Assistant Examiner* — Vincent W Chang
(74) *Attorney, Agent, or Firm* — Karceski IP Law, PLLC (57) ABSTRACT

A numerical control device that controls a machine tool that machines work by moving a tool relatively to the work on the basis of a machining program includes a analyzing unit that analyzes the machining program and generates movement command data, a detecting unit that detects abnormality during the machining, a retract control unit that supplies, when abnormality is detected, an operation command for a retract operation for retracting the tool from the work, and an integrating unit that integrates a movement amount of the tool based on the supplied operation command. The analyzing unit executes a tool retraction program for moving the tool or the work to a predetermined position after adding the movement amount of the tool integrated by the integrating unit to a coordinate value of the tool on the machining program to update the coordinate value at a point in time when the retract operation ends.

3 Claims, 7 Drawing Sheets

(52) U.S. Cl.
CPC .............. *G05B 2219/37077* (2013.01); *G05B 2219/50103* (2013.01); *G05B 2219/50109* (2013.01)

(56) References Cited

U.S. PATENT DOCUMENTS

| | | | |
|---|---|---|---|
| 6,202,003 | B1 | 3/2001 | Niwa |
| 6,397,111 | B1 | 5/2002 | Niwa |
| 6,591,148 | B1* | 7/2003 | Masuda ................ G05B 19/184 409/274 |
| 2009/0082900 | A1 | 3/2009 | Akaiwa et al. |
| 2011/0234141 | A1* | 9/2011 | Kataoka ............... G05B 19/406 318/563 |
| 2013/0257340 | A1 | 10/2013 | Sagasaki et al. |
| 2014/0103853 | A1* | 4/2014 | Yoshida .................. B23Q 5/58 318/563 |
| 2015/0137726 | A1* | 5/2015 | Tang .................. G05B 19/4061 318/563 |
| 2015/0378344 | A1 | 12/2015 | Yamashita et al. |
| 2016/0147123 | A1 | 5/2016 | Cheng et al. |
| 2016/0147213 | A1 | 5/2016 | Murakami |

FOREIGN PATENT DOCUMENTS

| | | |
|---|---|---|
| CN | 102205512 A | 10/2011 |
| CN | 103329056 A | 9/2013 |
| CN | 105051632 A | 11/2015 |
| DE | 4010364 A1 | 10/1990 |
| DE | 69317540 T2 | 8/1998 |
| DE | 102008035710 A1 | 2/2010 |
| DE | 102011014951 A1 | 9/2011 |
| DE | 102014116257 A1 | 5/2015 |
| JP | S61185105 U | 11/1986 |
| JP | H01223993 A | 9/1989 |
| JP | H02259911 | 10/1990 |
| JP | H07299777 | 11/1995 |
| JP | 2624174 B | 6/1997 |
| JP | 2000343478 | 12/2000 |
| JP | 2006172277 | 6/2006 |
| JP | 3810662 B | 8/2006 |
| JP | 2016099824 | 5/2016 |

OTHER PUBLICATIONS

Chinese Office Action dated Jan. 29, 2019, for Chinese Patent Application No. 201711320788.4.
Chinese Office Action dated Dec. 24, 2019, for Chinese Patent Application No. 201711320788.4.
German Office Action dated Jul. 10, 2020, for German Patent Application No. 102017222137.2.

* cited by examiner

COLLIDE EACH OTHER WITH INERTIA

FIG. 2B

MACHINE CAN BE SAFELY STOPPED

NUMERICAL CONTROL DEVICE

CROSS-REFERENCE TO RELATED APPLICATIONS

This application is based on and claims the benefit of priority to Japanese Patent Application No. 2016-244745, filed Dec. 16, 2016, the entire content of which is incorporated herein by reference.

FIELD OF THE INVENTION

The present invention relates to a numerical control device.

BACKGROUND OF THE INVENTION

There has been known a machining control device that, when a drop of a voltage due to a power failure or abnormality of a power supply occurs, adds data based on a tool retraction formula to machining path profile data, retracts a tool from work while continuing machining by the tool within a time period until a control operation is disabled, and thereafter stops a machine tool (see, for example, the Publication of Japanese Patent No. 3810662).

SUMMARY OF THE INVENTION

According to an aspect of the invention, there is provided a numerical control device that controls a machine tool that machines work by moving a tool relatively to the work on the basis of a machining program, the numerical control device including: a program analyzing unit that analyzes the machining program and generates movement command data; an abnormality detecting unit that detects abnormality during the machining; a retract control unit that supplies, when abnormality is detected by the abnormality detecting unit, an operation command for a retract operation for retracting the tool from the work; and a movement-amount integrating unit that integrates a movement amount of the tool based on the operation command supplied from the retract control unit. The program analyzing unit executes a tool retraction program for moving the tool or the work to a predetermined position after adding the movement amount of the tool by the retract operation integrated by the movement-amount integrating unit to a coordinate value of the tool on the machining program to update the coordinate value at a point in time when the retract operation by the retract control unit ends.

According to another aspect of the present invention, there is provided a numerical control device that controls a machine tool that machines work by moving a tool relatively to the work on the basis of a machining program, the numerical control device including: a program analyzing unit that analyzes the machining program and generates movement command data; an abnormality detecting unit that detects abnormality during the machining; a retract control unit that supplies, when abnormality is detected by the abnormality detecting unit, an operation command for a retract operation for retracting the tool from the work; and a total-movement-coordinate calculating unit that sequentially calculates a total movement coordinate obtained by adding up a program coordinate of the program analyzing unit and an integrated value of a movement amount supplied from the retract control unit. The program analyzing unit executes a tool retraction program for moving the tool or the work to a predetermined position after updating a coordinate value on the machining program to the total movement coordinate calculated by the total-movement-coordinate calculating unit at a point in time when the retract operation by the retract control unit ends.

DESCRIPTION OF EMBODIMENT(S) OF THE INVENTION

A numerical control device 1 according to an embodiment of the present invention is explained below with reference to the drawings.

Figure 1:
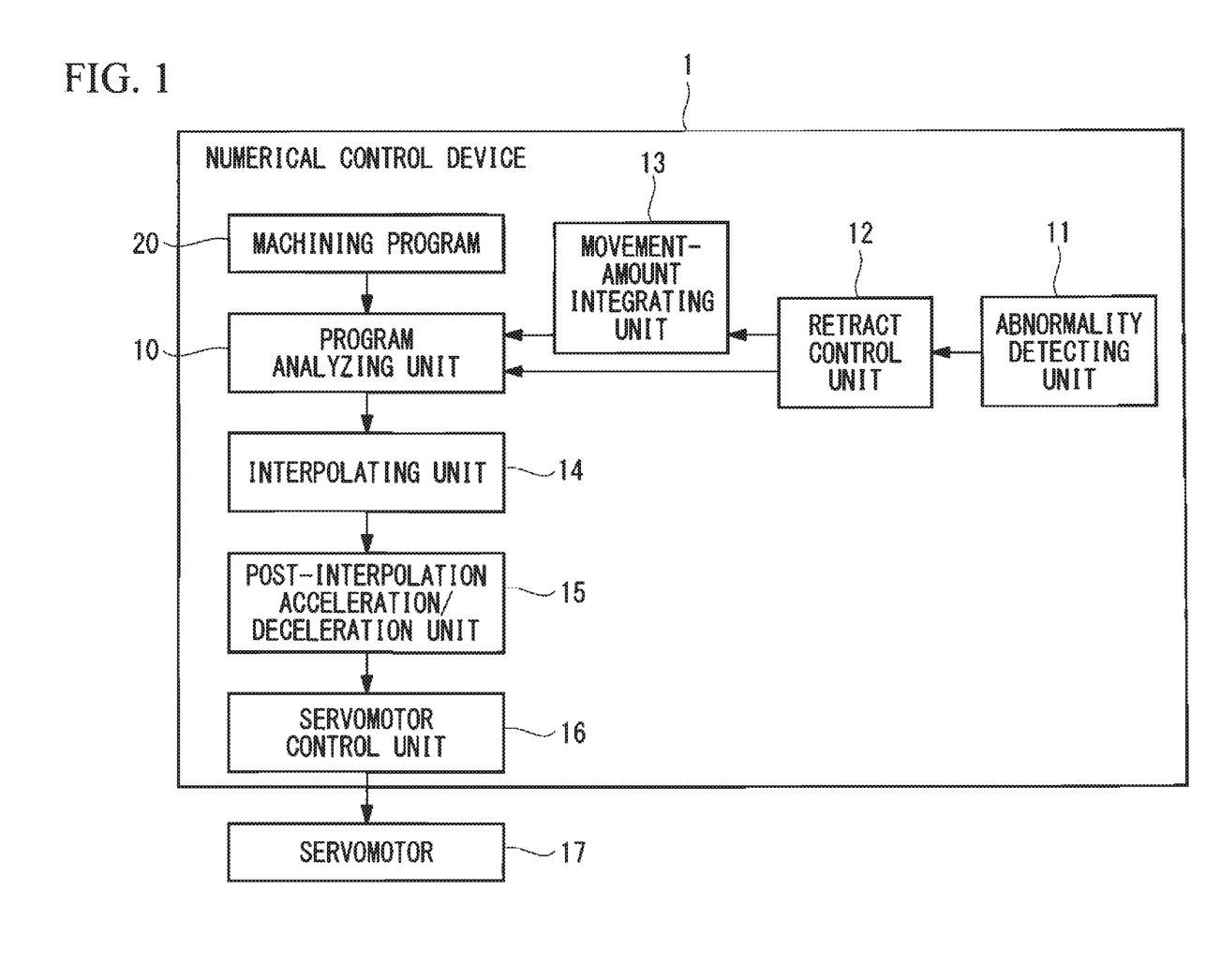
FIG. 1 is a block diagram of a numerical control device according to an embodiment of the present invention.

The numerical control device 1 according to this embodiment includes, as shown in FIG. 1, a program analyzing unit 10, an abnormality detecting unit 11, a retract control unit 12, a movement-amount integrating unit 13, an interpolating unit 14, a post-interpolation acceleration/deceleration unit 15, and a servomotor control unit 16.

The program analyzing unit 10 analyzes a machining program 20 that is stored in a memory or the like (not shown) or input from a MDI/display means or the like (not shown), and generates movement command data for driving axes of a machine in a program coordinate (a coordinate on a program) set in the machining program 20.

The interpolating unit 14 generates data obtained by performing interpolation calculation of points on a command route at an interpolation cycle on the basis of movement command data output by the program analyzing unit 10.

The post-interpolation acceleration/deceleration unit 15 performs acceleration/deceleration processing on the basis of interpolation data output by the interpolating unit 14, calculates speeds of driving axes at each interpolation cycle, and outputs result data to the servomotor control unit 16.

The servomotor control unit 16 controls driving units of a machine tool such as a servomotor 17 on the basis of the output of the post-interpolation acceleration/deceleration unit 15.

The abnormality detecting unit 11, for example, monitors a voltage from a power supply, detects a point in time when a voltage drop such as a power failure occurs, and outputs a detection signal to the retract control unit 12.

The retract control unit 12 generates an operation command for a tool to retract from work according to a retract amount and speed decided by parameters or the like in advance. The generated movement command is superimposed on the movement command data output from the program analyzing unit 10.

For example, when the detection signal from the abnormality detecting unit 11 arrives, in some case, the retract control unit 12 outputs an operation command by the retract amount decided by the parameters in advance and, in other cases, the retract control unit 12 outputs an operation command for retract until machining in one cycle operation is ended when a cycle operation is repeatedly executed to perform machining.

The movement-amount integrating unit 13 integrates a movement amount of the tool based on the operation command for the retract operation supplied from the retract control unit 12.

Figure 2A:
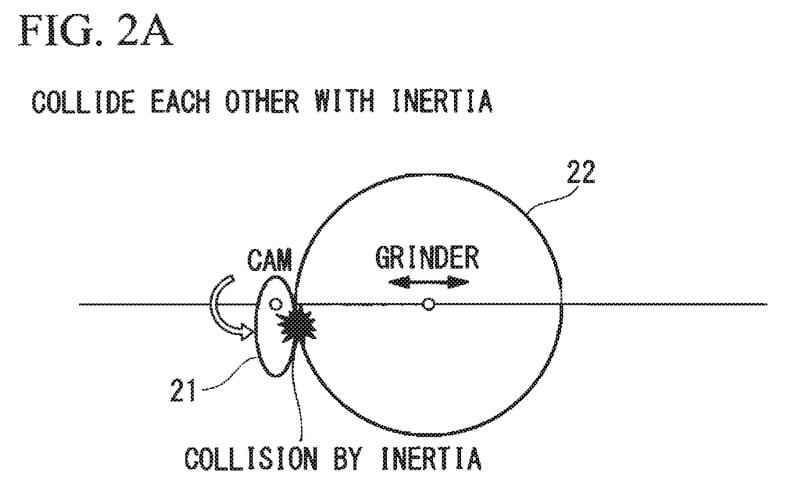
FIG. 2A is a diagram for explaining machining in a retract operation during repeated execution of a cycle operation of the numerical control device shown in FIG. 1.
Figure 2B:
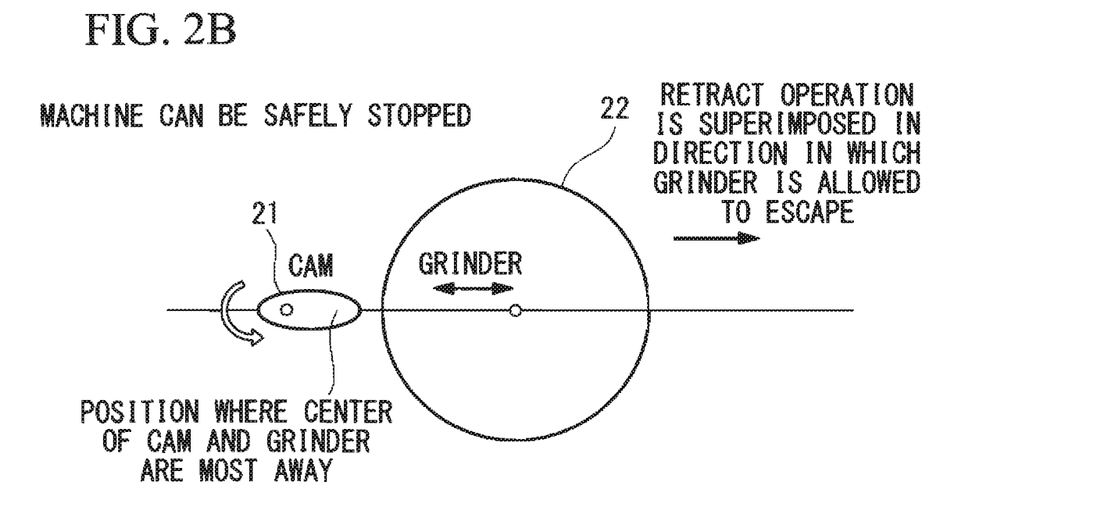
FIG. 2B is a diagram for explaining a stop of the machining in the retract operation during repeated execution of the cycle operation of the numerical control device shown in FIG. 1.

FIGS. 2A and 2B are explanatory diagrams of the retract operation at the time when the cycle operation is repeatedly executed to perform machining.

A cam (work) 21 in the figure is rotated by a rotary axis. A grinder (a tool) 22 in the figure is moved back and forth by a linear axis. The grinder 22 repeatedly executes operation of one cycle, in which the rotary axis and the linear axis operate in synchronization with each other, to thereby machine the cam 21. When the machining is stopped in a position shown in FIG. 2A, the rotary axis turns with inertia and the cam 21 and the grinder 22 collide with each other. Therefore, as shown in FIG. 2B, it is necessary to stop the machining in a position where the cam 21 and the grinder 22 are most away from each other.

If the retract operation is performed when the cycle operation is repeatedly executed to perform machining, a movement amount of the retract operation is irregular because a point in time of abnormality detection is irregular and the retract operation is ended at the end of one cycle operation. Therefore, the movement-amount integrating unit 13 integrates, until the retract operation ends, a movement amount by the retract operation output from the retract control unit 12. At a point in time when the retract operation ends, the movement-amount integrating unit 13 outputs the integrated movement amount to the program analyzing unit 10.

The program analyzing unit 10 adds up the integrated movement amount of the retract operation input from the movement-amount integrating unit 13 and a program coordinate value recognized on the machining program 20 and updates the program coordinate value as a new program coordinate value. The program analyzing unit 10 executes the tool retraction program after the program coordinate value is updated.

The tool retraction program is a program for further moving the work or the tool to a position where it is easy to resume operation.

Operation of the numerical control device 1 according to this embodiment configured as explained above is explained below.

With the numerical control device 1 according to this embodiment, the tool moves relatively to the work according to the movement command data generated by the program analyzing unit 10 on the basis of the machining program 20. Predetermined machining is applied to the work.

Figure 3:
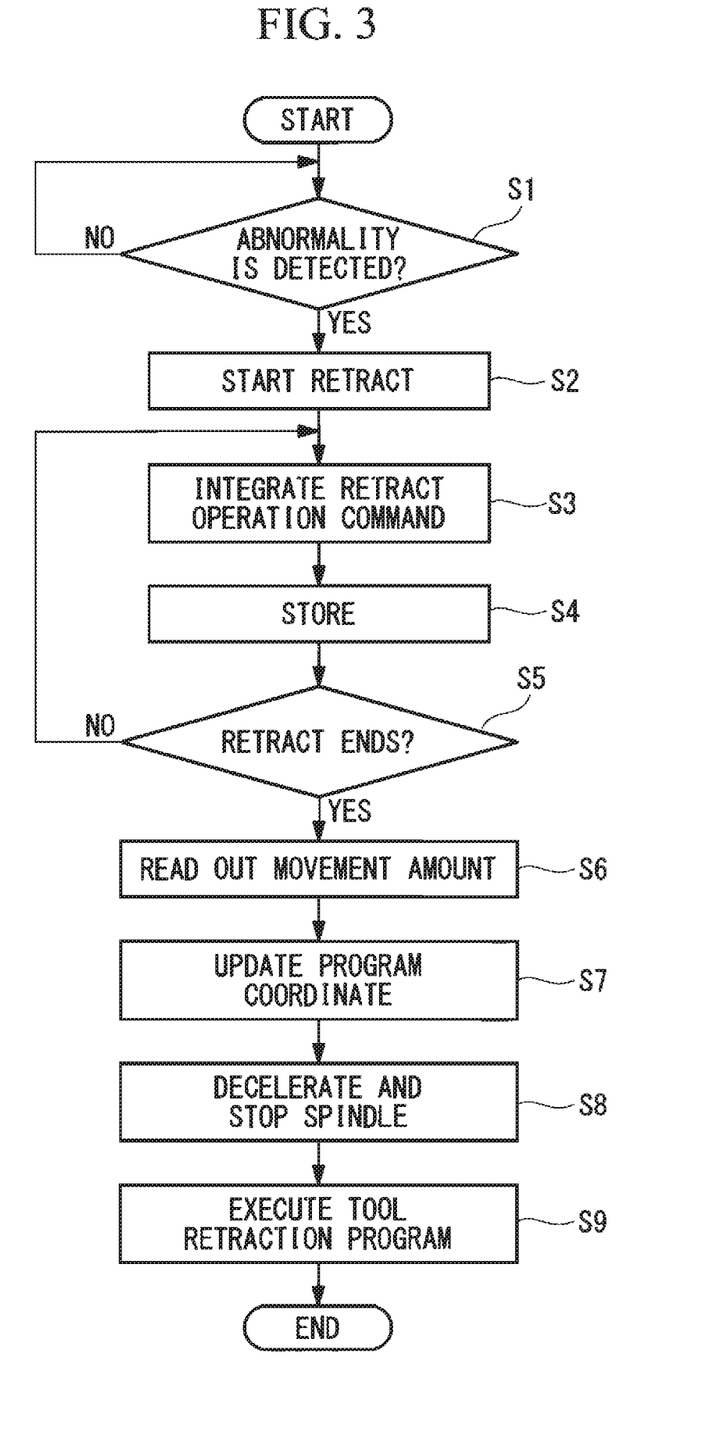
FIG. 3 is a flowchart for explaining control during abnormality occurrence in the numerical control device shown in FIG. 1.

When abnormality such as a power failure occurs during the machining, as shown in FIG. 3, the abnormality is detected by the abnormality detecting unit 11 (step S1), an abnormality detection signal is sent to the retract control unit 12, and a retract operation is started (step S2). In step S2, an integrated value of the operation command for the retract operation is initialized to 0.

At a point in time when the abnormality detection signal is input, the retract control unit 12 generates an operation command for the tool to retract from the work according to the retract amount and the speed decided by the parameters and the like in advance.

Figure 4:
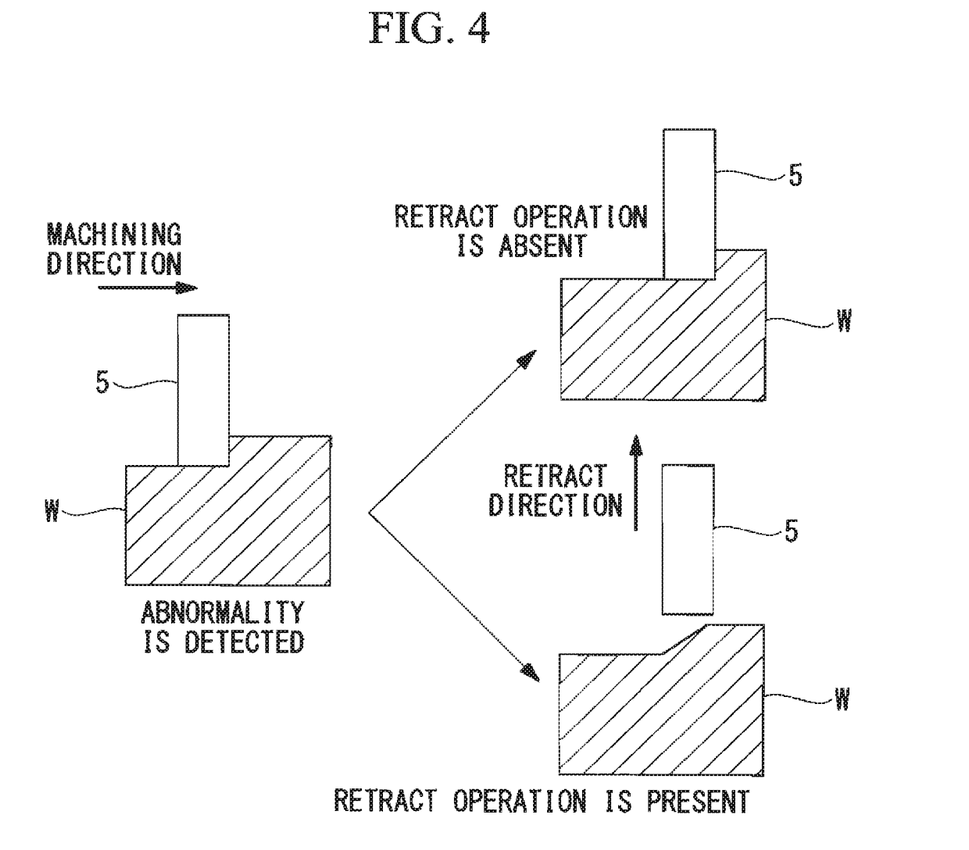
FIG. 4 is a schematic diagram for explaining presence and absence of the retract operation of the numerical control device shown in FIG. 1.

Even during the retract operation, the supply of the operation command for the machining of the work by the program analyzing unit 10 is continued. Therefore, the operation command for the retract operation output from the retract control unit 12 is superimposed on the operation command for machining the work and output. Consequently, as shown in FIG. 4, a tool 5 is retracted from work W while continuing machining of the work W. It is possible to prevent damage to the work W and the tool 5 due to a sudden stop of the tool 5 and a sudden change of a direction of the tool 5.

In this case, as shown in FIG. 4, when positions of the tool 5 due to presence and absence of the retract operation are compared, the positions are different in that, when the retract operation is performed, for example, the tool 5 is moved in a direction away from the work W compared with when the retract operation is not performed.

However, the tool 5 is moved according to a program by the program analyzing unit 10 and moved in the direction away from the work W by the retract control unit 12. On the program, the program analyzing unit 10 recognizes that the tool 5 is disposed in the same position on the program coordinate as a position where the tool 5 is disposed when the retract operation is absent.

Therefore, in this embodiment, simultaneously with the start of the retract operation, the operation command output from the retract control unit 12 is integrated in the movement-amount integrating unit 13 (step S3) and stored (step S4). Processing in steps S3 and S4 is repeated until the retract operation ends (step S5). A movement amount of the tool 5 calculated and stored by the movement-amount integrating unit 13 is read out at a point in time of the end of the retract operation and input to the program analyzing unit 10 (step S6).

The program analyzing unit 10 adds the movement amount stored in the program coordinate value recognized by the program analyzing unit 10 to the program coordinate value and updates the program coordinate value (step S7). Consequently, it is possible to match the positions of the motors on the program coordinate and positions of the real motors, that is, the position of the tool on the program coordinate and the position of the real tool 5.

Figure 5:
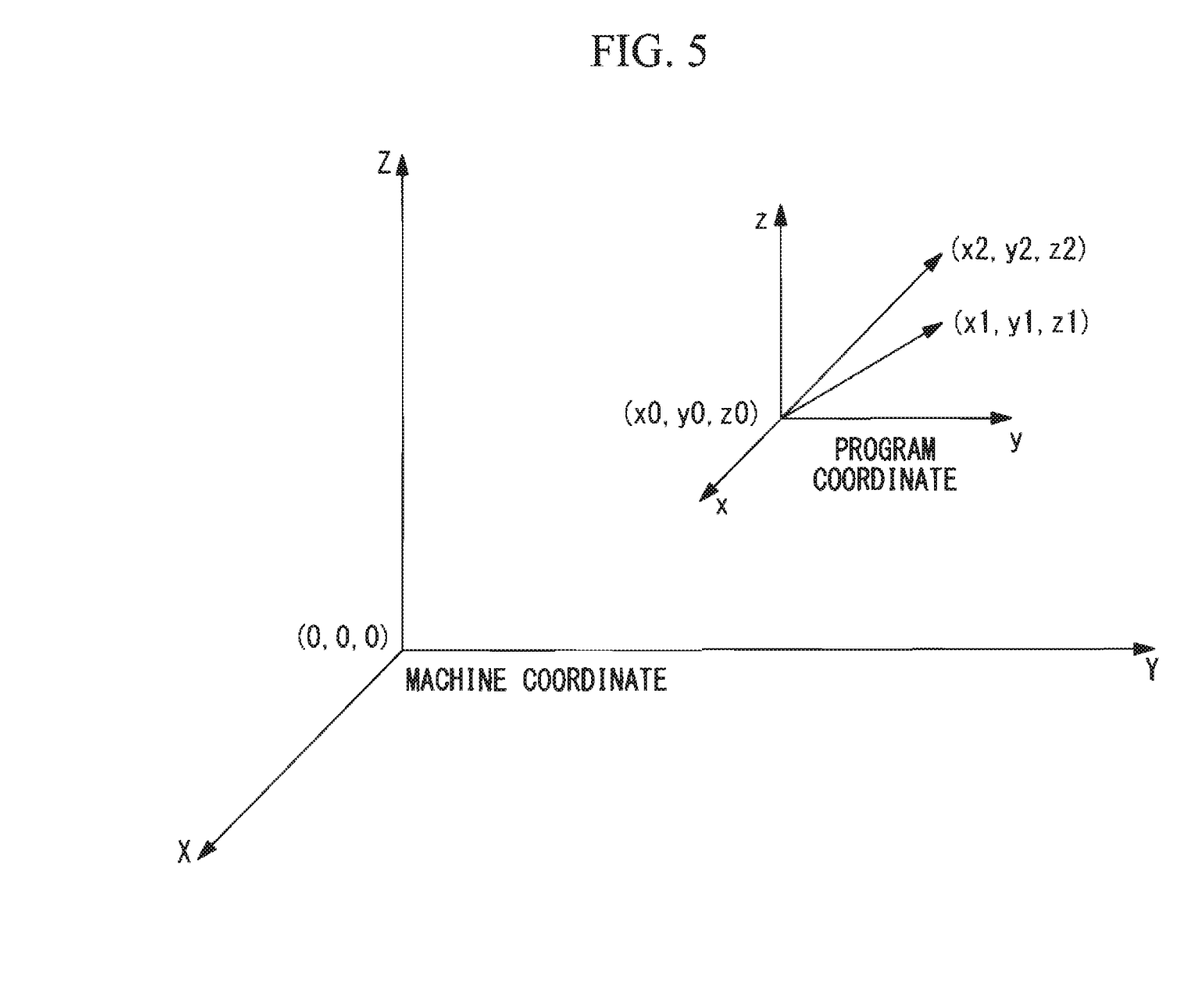
FIG. 5 is a diagram for explaining positions on a machine coordinate of a tool due to the presence and absence of the retract operation of the numerical control device shown in FIG. 1.

That is, as shown in FIG. 5, on the machining program, if it is recognized that the tool 5 is moved from (x0, y0, z0) to (x1, y1, z1) in the program coordinate, when the tool 5 is moved to (x2, y2, z2) according to addition of the retract operation, a movement amount (x2−x1, y2−y1, z2−z1) is calculated by the movement-amount integrating unit 13. It is possible to input the calculated movement amount (x2−x1, y2−y1, z2−z1) to the program analyzing unit 10, and add the movement amount (x2−x1, y2−y1, z2−z1) to the present position (x1, y1, z1) recognized by the program analyzing unit 10 in the program coordinate to update the present position to (x2, y2, z2).

In this way, the positions of the motors on the program coordinate recognized in the program analyzing unit 10 and positions of the real motors coincide with each other. Therefore, the program analyzing unit 10 can quickly executes the tool retraction program and move the tool 5 to a predetermined position without taking procedures such as an automatic operation pause state, reset, selection of the tool retraction program, and a cycle start (step S9).

As a result, it is possible to save time periods required for the procedures such as an automatic operation pause state, reset, selection of the tool retraction program, and a cycle start. It is possible to quickly and more surely retract the tool 5 from the work W. There is an advantage that it is possible to greatly reduce a time period required from abnormality occurrence detection until the tool 5 is sufficiently retracted.

After the retract operation ends, the program analyzing unit 10 desirably decelerates and stops the spindle (step S8). Consequently, there is an advantage that it is possible to collect and use regenerative energy by the deceleration of the spindle and it is possible to supplement electric power in the case of a stop due to a power failure and more surely execute the tool retraction program.

Figure 6:
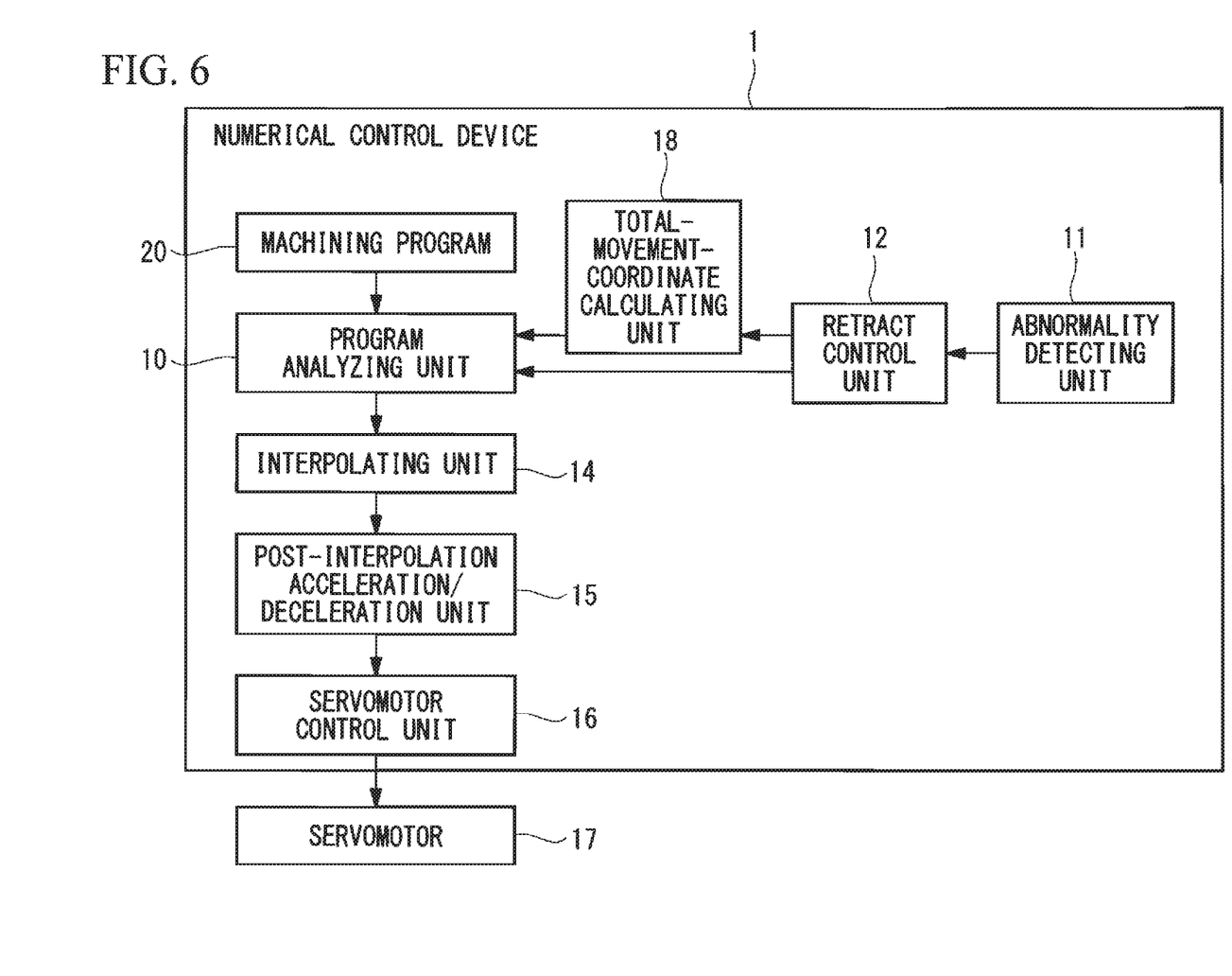
FIG. 6 is a block diagram showing a modification of the numerical control device shown in FIG. 1.

In this embodiment, the movement-amount integrating unit 13 that integrates a movement amount of the tool 5 during the retract operation is provided. When the retract operation ends, the movement amount output from the movement-amount integrating unit 13 is added to the program coordinate value stored in the program analyzing unit 10 to update the program coordinate value. Instead of this, the movement-amount integrating unit 13 may not be provided. The numerical control device 1 may include a total-movement-coordinate calculating unit 18 that adds up the program coordinate value of the program analyzing unit 10 and the integrated value of the movement amount output from the retract control unit 12 to calculate a total movement coordinate. When the retract operation ends, the program coordinate value stored in the program analyzing unit 10 may be updated to the total movement coordinate calculated by the total-movement-coordinate calculating unit 18.

Figure 7:
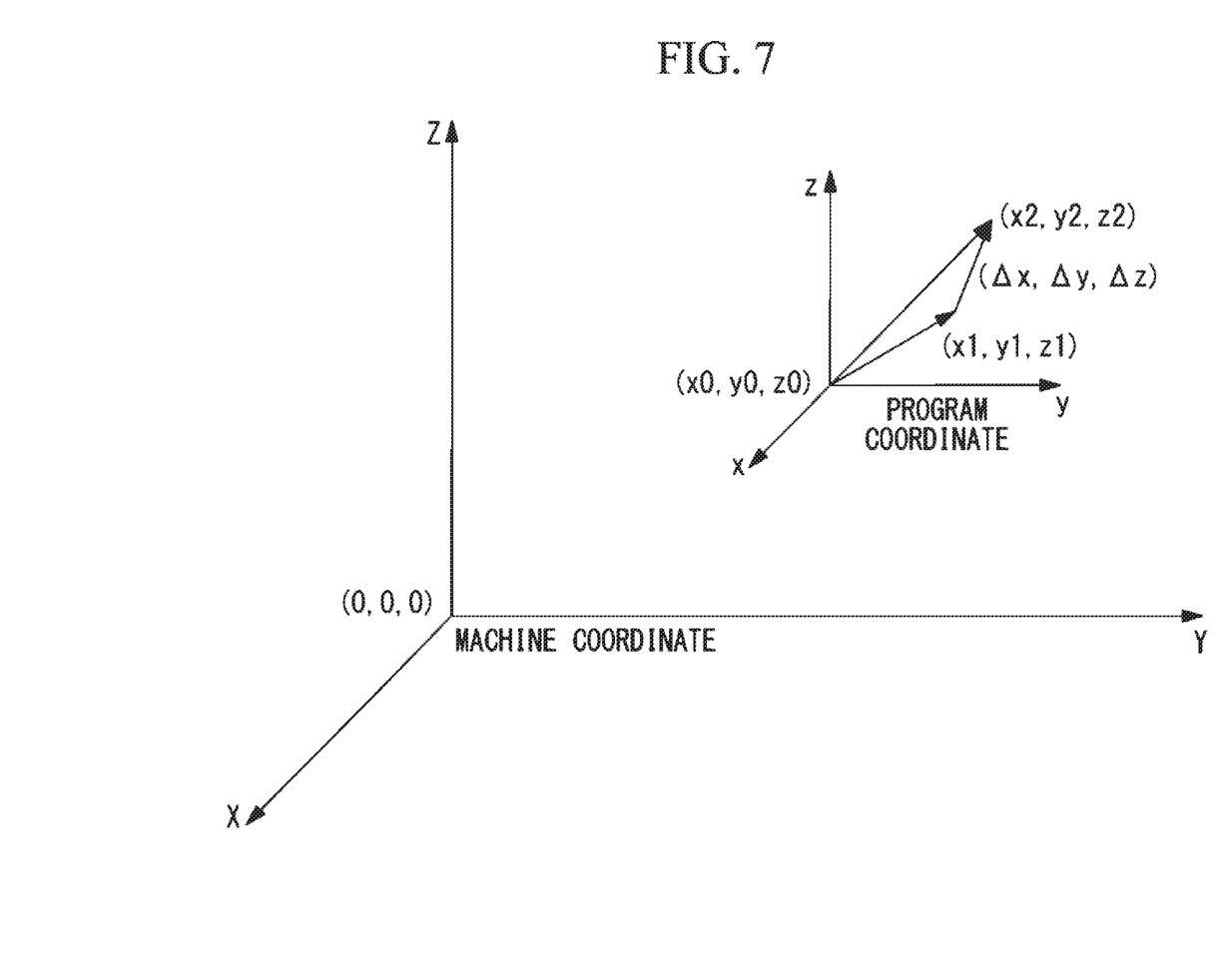
FIG. 7 is a diagram for explaining positions on a machine coordinate of a tool due to presence and absence of the retract operation of the numerical control device shown in FIG. 6.

That is, as shown in FIG. 7, on the machining program, if it is recognized that the tool 5 is moved from (x0, y0, z0) to (x1, y1, z1) in the program coordinate, when the retract operation moves the tool 5 by ($\Delta$x, $\Delta$y, $\Delta$z), the total-movement-coordinate calculating unit 18 always calculates (x1+$\Delta$x, y1+$\Delta$y, z1+$\Delta$z). Therefore, the total movement coordinate output by the total-movement-coordinate calculating unit 18 at a point in time when the retract operation ends is (x1+$\Delta$x, y1+$\Delta$y, z1+$\Delta$z). In the above example, if ($\Delta$x, $\Delta$y, $\Delta$z)=(x2−x1, y2−y1, z2−z1), by replacing the program coordinate with the total movement coordinate itself, it is possible to update the present position on the program coordinate to (x2, y2, z2).

From the above-described embodiment, the following invention is derived.

According to an aspect of the invention, there is provided a numerical control device that controls a machine tool that machines work by moving a tool relatively to the work on the basis of a machining program, the numerical control device including: a program analyzing unit that analyzes the machining program and generates movement command data; an abnormality detecting unit that detects abnormality during the machining; a retract control unit that supplies, when abnormality is detected by the abnormality detecting unit, an operation command for a retract operation for retracting the tool from the work; and a movement-amount integrating unit that integrates a movement amount of the tool based on the operation command supplied from the retract control unit. The program analyzing unit executes a tool retraction program for moving the tool or the work to a predetermined position after adding the movement amount of the tool by the retract operation integrated by the movement-amount integrating unit to a coordinate value of the tool on the machining program to update the coordinate value at a point in time when the retract operation by the retract control unit ends.

According to this aspect, the tool moves relatively to the work and predetermined machining is applied to the work according to the movement command data generated on the basis of the machining program analyzed by the program analyzing unit. When abnormality such as a power failure occurs during the machining of the work by the tool, the abnormality is detected by the abnormality detecting unit. The operation command for the retract operation is supplied by the retract control unit.

Even during the retract operation, the machining of the work by the movement command data generated by the program analyzing unit is continued. Therefore, the operation command for the retract operation is superimposed on the movement command data generated by the program analyzing unit. Consequently, the tool is retracted from the work while continuing the machining of the work. It is possible to prevent damage to the work and the tool due to a sudden stop or a sudden change of a direction of the tool.

In this case, during the retract operation, the movement amount of the tool based on the operation command supplied from the retract control unit is integrated by the movement-amount integrating unit. When the retract operation ends, the integrated movement amount is added to the coordinate value of the tool on the machining program and the coordinate value is updated by the program analyzing unit. Consequently, the coordinate value of the tool on the machining program is matched with a coordinate value of the real tool.

Thereafter, by executing the tool retraction program, it is possible to retract the tool or the work to the predetermined position. That is, by updating the coordinate value of the tool on the machining program when the retract operation ends, it is possible to match a present position of the tool with a position grasped on the machining program. It is possible to immediately execute the tool retraction program without taking procedures such as an automatic operation pause state, reset, selection of the tool retraction program, and a cycle start. Consequently, when the machining is stopped because of abnormality detection, it is possible to execute the retract operation and the tool retraction program in a short time. It is possible to reduce cost of an uninterruptible power supply such as a large-capacity capacitor module.

According to another aspect of the present invention, there is provided a numerical control device that controls a machine tool that machines work by moving a tool relatively to the work on the basis of a machining program, the numerical control device including: a program analyzing unit that analyzes the machining program and generates movement command data; an abnormality detecting unit that detects abnormality during the machining; a retract control unit that supplies, when abnormality is detected by the abnormality detecting unit, an operation command for a retract operation for retracting the tool from the work; and a total-movement-coordinate calculating unit that sequentially calculates a total movement coordinate obtained by adding up a program coordinate of the program analyzing unit and an integrated value of a movement amount supplied from the retract control unit. The program analyzing unit executes a tool retraction program for moving the tool or the work to a predetermined position after updating a coordinate value on the machining program to the total movement coordinate calculated by the total-movement-coordinate calculating unit at a point in time when the retract operation by the retract control unit ends.

According to this aspect, during the retract operation, the total movement coordinate obtained by adding up the integrated value of the movement amount of the tool based on the operation command supplied from the retract control unit and the program coordinate value of the program analyzing unit is sequentially calculated by the total-movement-coordinate calculating unit. Therefore, when the retract operation ends, the calculated total movement coordinate is set as the coordinate value of the tool on the machining program by the program analyzing unit. Consequently, the coordinate value of the tool on the machining program is matched with a coordinate value of the real tool.

Thereafter, by executing the tool retraction program, it is possible to retract the tool or the work to the predetermined position. That is, by updating the coordinate value of the tool on the machining program when the retract operation ends, it is possible to match a present position of the tool with a position grasped on the machining program. It is possible to immediately execute the tool retraction program without taking procedures such as an automatic operation pause state, reset, selection of the tool retraction program, and a cycle start. Consequently, when the machining is stopped because of abnormality detection, it is possible to execute the retract operation and the tool retraction program in a short time. It is possible to reduce cost of an uninterruptible power supply such as a large-capacity capacitor module.

In the aspect, after the retract operation by the retract control unit ends, the program analyzing unit may decelerate rotation of a spindle, which rotates the tool, and collect regenerative energy of the spindle.

In this way, it is possible to collect and use the regenerative energy generated by the deceleration of the rotation of the spindle. It is possible to supplement electric power in the case of a stop due to a power failure and more surely execute the tool retraction program.

The invention claimed is:

1. A numerical control device, comprising:
an analyzer that analyzes a machining program to generate movement command data for moving a tool and that sequentially recognizes a program coordinate value, which is a coordinate value of the tool on the machining program and which is based on the generated movement command data, wherein the machining program is for machining a work by repeatedly executing a cycle operation by the tool;
a detector that detects an abnormality during the machining;
a controller that supplies an operation command for a retract operation for retracting the tool from the work during a time period from detection of the abnormality by the detector until one cycle operation by the tool ends by retracting the tool from a first program coordinate value (x1, y1, z1) to a second program coordinate value (x2, y2, z2); and
an integrator that integrates a movement amount (x2−x1, y2−y1, z2−z1) of the tool based on the operation command supplied from the controller, wherein the movement amount (x2−x1, y2−y1, z2−z1) is calculated as a difference between the first program coordinate value (x1, y1, z1) and the second program coordinate value (x2, y2, z2),
wherein, when the retract operation by the controller ends, the analyzer recognizes a value obtained by adding up the movement amount (x2−x1, y2−y1, z2−z1) and the recognized program coordinate value as a new program coordinate value, and then executes a tool retraction program for moving the tool or the work to a predetermined position.

2. A numerical control device, comprising:
an analyzer that analyzes a machining program to generate movement command data for moving a tool and that sequentially recognizes a program coordinate value, which is a coordinate value of the tool on the machining program and which is based on the generated movement command data, wherein the machining program is for machining a work by repeatedly executing a cycle operation by the tool;
a detector that detects an abnormality during the machining;
a controller that supplies an operation command for a retract operation for retracting the tool from the work during a time period from detection of the abnormality by the detector until one cycle operation by the tool ends by retracting the tool from a first program coordinate value (x1, y1, z1) by a difference ($\Delta x$, $\Delta y$, $\Delta z$); and
a calculator that sequentially calculates a total movement coordinate value (x1+$\Delta x$, y1+$\Delta y$, z1+$\Delta z$) obtained by adding up the program coordinate value recognized by the analyzer and an integrated value of a movement amount of the tool based on the operation command supplied from the controller when the retract operation ends,
wherein, when the retract operation by the controller ends, the analyzer recognizes the total movement coordinate value (x1+$\Delta x$, y1+$\Delta y$, z1+$\Delta z$) as a new program coordinate value, and then executes a tool retraction program for moving the tool or the work to a predetermined position.

3. The numerical control device according to claim 1, wherein, after the retract operation by the controller ends, the analyzer decelerates rotation of a spindle, which rotates the tool, and collects regenerative energy of the spindle.

* * * * *